United States Patent
Dropps et al.

(10) Patent No.: US 8,989,191 B1
(45) Date of Patent: Mar. 24, 2015

(54) SYSTEMS AND METHODS FOR HARD ZONING IN NETWORKS

(71) Applicant: QLOGIC, Corporation, Aliso Viejo, CA (US)

(72) Inventors: Frank R. Dropps, Maple Grove, MN (US); Gary M. Papenfuss, St. Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 342 days.

(21) Appl. No.: 13/678,055

(22) Filed: Nov. 15, 2012

(51) Int. Cl.
*H04L 12/28* (2006.01)
*H04L 12/741* (2013.01)

(52) U.S. Cl.
CPC .................................... *H04L 45/74* (2013.01)
USPC .......................................................... 370/392

(58) Field of Classification Search
None
See application file for complete search history.

(56) References Cited

U.S. PATENT DOCUMENTS

| 2004/0081186 A1* | 4/2004 | Warren et al. ................ 370/419 |
| 2004/0085974 A1* | 5/2004 | Mies et al. .................... 370/406 |
| 2005/0018672 A1* | 1/2005 | Dropps et al. ................ 370/389 |

* cited by examiner

*Primary Examiner* — Andrew Lai
*Assistant Examiner* — Jamaal Henson
(74) *Attorney, Agent, or Firm* — Klein, O'Neill & Singh, LLP

(57) ABSTRACT

Method and system for a network device configured to control access to other devices in a network is provided. The network device includes a port configured to receive a frame. The port includes a plurality of sub-ports configured to operate as independent ports for sending and receiving frames using one of a plurality of network links at a plurality of rates and complying with a plurality of protocols. The network device also includes a source address look up table (ALUT) and a destination address look up table (LLUT), wherein when the frame is received the network device is configured to compare a source identifier of the frame and a destination identifier of the frame to the ALUT and the LLUT. When one ALUT table entry matches the source identifier of the frame, the network device outputs a bit map of zones based on the source identifier of the frame, compares the output bit map of zones with a zone bit map of the LLUT, and when there are any matching bits between the two maps, transmits the frame.

20 Claims, 5 Drawing Sheets

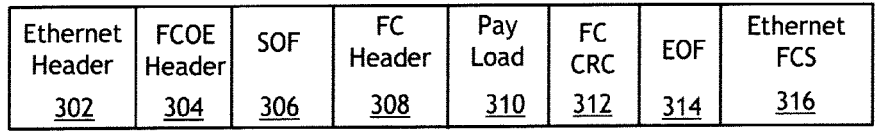
Figure 3A
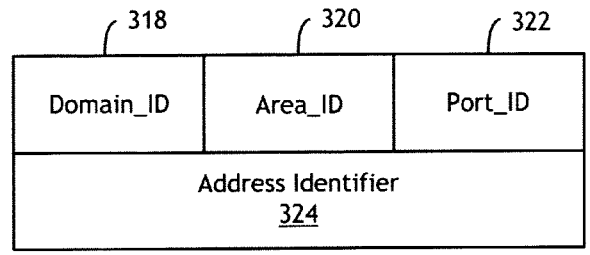
Figure 3B
| Word/Bits | FC Header 308 | | | |
|---|---|---|---|---|
| | 31    24 | 23    16 | 15    08 | 07    00 |
| 0 | R_CTL | D_ID | | 308A |
| 1 | CS_CTL/Priority | S_ID | | 308B |
| 2 | Type | F_CTL | | |
| 3 | SEQ_ID | DF_CTL | SEQ_CNT | |
| 4 | OX_ID | | RX_ID | |
| 5 | Parameter | | | |
Figure 3C
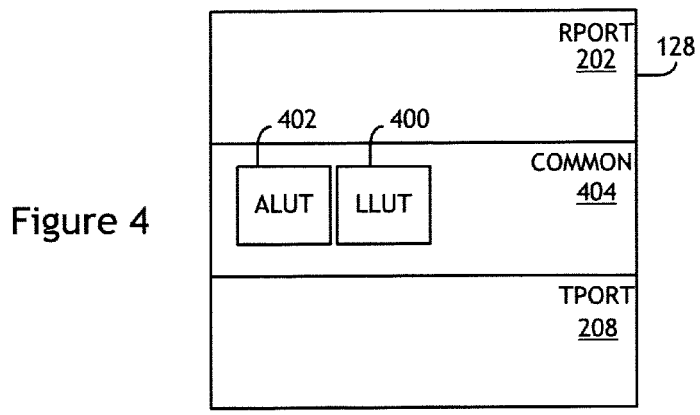
Figure 4

SYSTEMS AND METHODS FOR HARD ZONING IN NETWORKS

BACKGROUND

1. Technical Field

The present embodiments relate to network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

A network switch is typically a multi-port network device where each port manages a point-to-point connection between itself and an attached system. Each port can be attached to a server, peripheral, input/output subsystem, bridge, hub, router, or another switch, where each of the aforementioned network devices also has one or more ports. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

The present embodiments extend S_ID (source identifier) hard zoning to Ethernet so that a converged network adapter (CNA) initiator can access some network devices, but is denied access to others. Methods are also described for a switch to intercept an initiator's discovery process so it does not try to access devices that it is not allowed to use, avoiding extra error reporting. This feature allows better integrating of Ethernet ports using FCoE protocol to interface with FC fabrics.

One embodiment provides a machine-implemented method for controlling access to network devices in a network. The method includes receiving a frame at a port of one of the network devices; wherein the port includes a plurality of sub-ports configured to operate as independent ports for sending and receiving frames using one of a plurality of network links at a plurality of rates and complying with a plurality of protocols; sending a source identifier of the frame and a destination identifier of the frame to a source address look up table (ALUT) and a destination address look up table (LLUT); comparing the source identifier of the frame with entries in the ALUT; outputting a bit map of zones based on the source identifier of the frame when one ALUT table entry matches the source identifier of the frame; comparing the output bit map of zones with a zone bit map of the LLUT; and transmitting the frame when there are any matching bits between the two maps.

Another embodiment provides a switch element configured to control access to devices in a network. The switch element includes a port configured to receive a frame. The port includes a plurality of sub-ports configured to operate as independent ports for sending and receiving frames using one of a plurality of network links at a plurality of rates and complying with a plurality of protocols. The switch also includes a source address look up table (ALUT) and a destination address look up table (LLUT), wherein when the frame is received the switch element is configured to compare a source identifier of the frame and a destination identifier of the frame to the ALUT and the LLUT. When one ALUT table entry matches the source identifier of the frame, the switch element outputs a bit map of zones based on the source identifier of the frame, compares the output bit map of zones with a zone bit map of the LLUT, and when there are any matching bits between the two maps, transmits the frame.

This brief summary has been provided so that the nature of the invention may be understood quickly. A more complete understanding of the present disclosure can be obtained by reference to the following detailed description of the preferred embodiments thereof concerning the attached drawing.

BRIEF DESCRIPTION OF THE DRAWINGS

The various present embodiments now will be discussed in detail with an emphasis on highlighting the advantageous features. These embodiments depict the novel and non-obvious systems and methods for hard zoning in networks shown in the accompanying drawings, which are for illustrative purposes only. These drawings include the following figures, in which like numerals indicate like parts:

FIG. 1 is a functional block diagram of a network that the present embodiments may be used in connection with;

FIG. 3A shows an example Fibre Channel over Ethernet (FCoE) packet format;

FIG. 3B shows a standard 24-bit Fibre Channel (FC) address identifier;

FIG. 3C shows an example of the FC header of FIG. 3A; and

FIG. 4 is another functional block diagram of a port of the switch element of FIG. 2.

DETAILED DESCRIPTION

Figure 1:
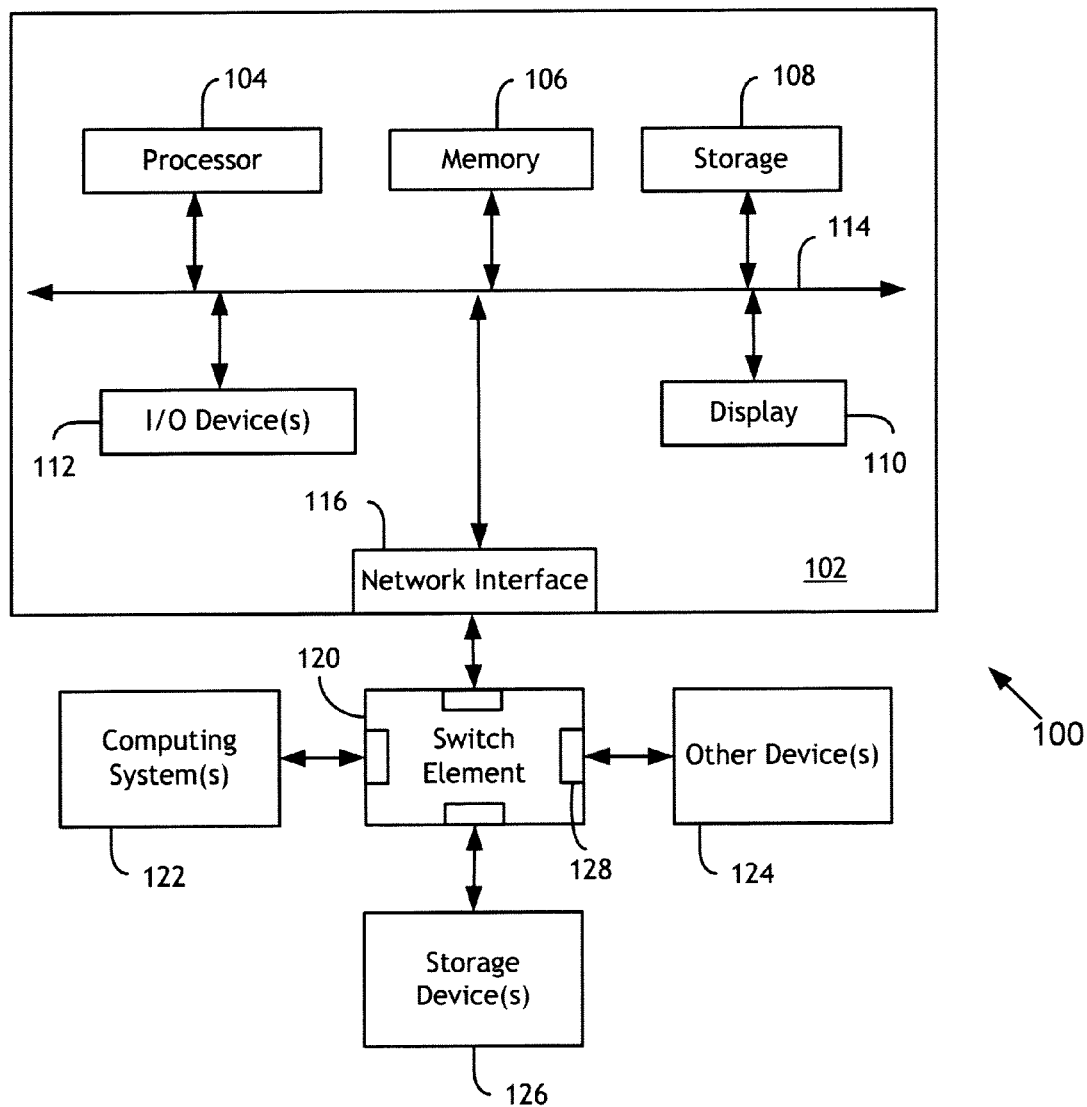

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory, computer-readable media. The computer program product may be non-transitory computer storage media readable by a computer device, and encoding a computer program of instructions for executing a computer process.

Various network standards and protocols may be used to enable network communications, including Fibre Channel (FC). Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. The system 100 includes a computing system 102, which may be referred to as a host system. A typical host system 102 includes several functional components, including a central processing unit (CPU) (also referred to as a processor/processors or processing module) 104, a host memory (or main/system memory) 106, a storage device 108, a display 110, input/output ("I/O") device(s) 112, and other components (or devices).

The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices. Instructions that implement the processes described below may reside in and may be executed (by the processor 104) from the memory 106.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation, that can process information complying with storage and network protocols, for example, Fibre Channel and Ethernet. As an example, the network interface 116 may be a Fibre Channel over Ethernet (FCoE) adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server, databases, and other application types. Data for various applications may be shared between the computing systems 122 and stored at the storage devices 126. Information may be sent via the ports 128 to a destination via the switch 120. The term port as used herein includes logic and circuitry for receiving, processing, and transmitting information. Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. network interface 116 for the host system 102 and any interface (not shown) for the storage devices 126. Fabric ports are typically located in Fabric devices, such as the switch 120. Details regarding the switch 120 are provided below.

Figure 2A:
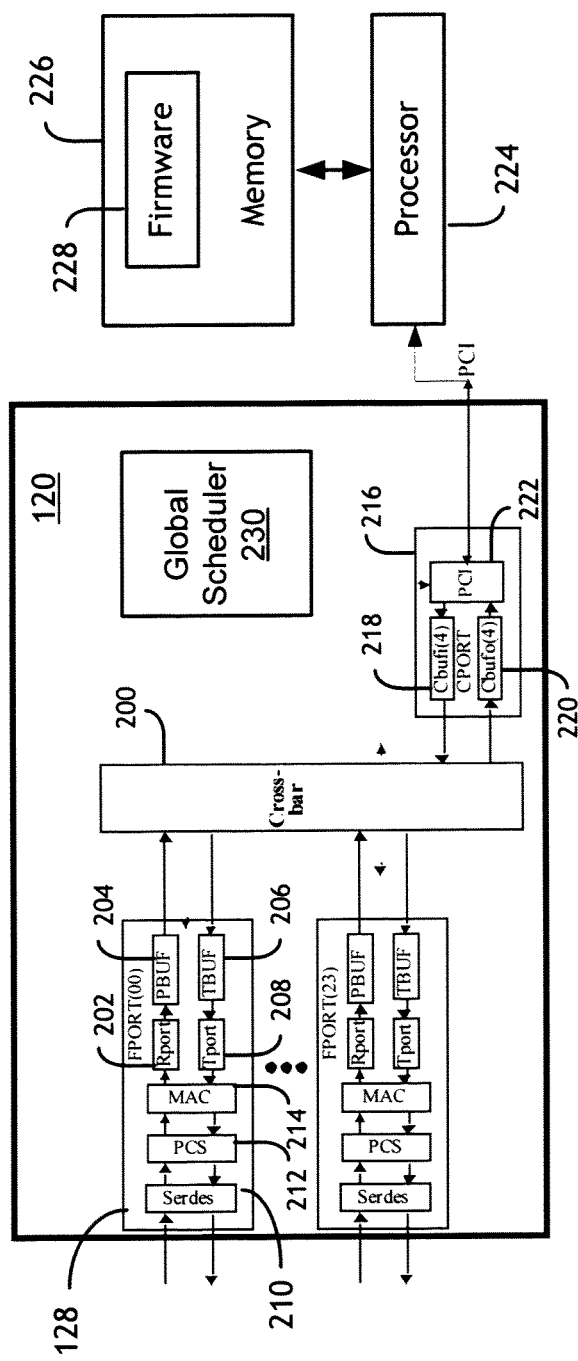
FIG. 2A is a functional block diagram of a switch element according to the present embodiments.

FIG. 2A is a block diagram of the switch 120, also referred to as the switch element 120. The Switch element 120 may be implemented as an application specific integrated circuit (ASIC) having a plurality of ports 128. The ports 128 are generic (GL) and may include N_Port, F_Port, FL_Port, E-Port, or any other port type. The ports 128 may be configured to operate as FCoE or Ethernet ports. In other words, depending upon what it is attached to, each GL port can function as any type of port. As an example, the ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

The ports 128 communicate via a crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared pipeline for receiving frames (or information). The pipeline includes a serializer/deserializer (SERDES) 210, a physical coding sub-layer (PCS) 212, and a media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT) via the crossbar 200 and a transmit buffer (TBUF) 206. The TBUF 206 is a temporary memory storage device where frames or information related to frames are staged before being transmitted.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 stores firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 to the processor 224.

Port 128 described above may be referred to as a "base port" that may have more than one network link available for receiving and transmitting information. Each network link allows the base port to be configured into a plurality of independently operating sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
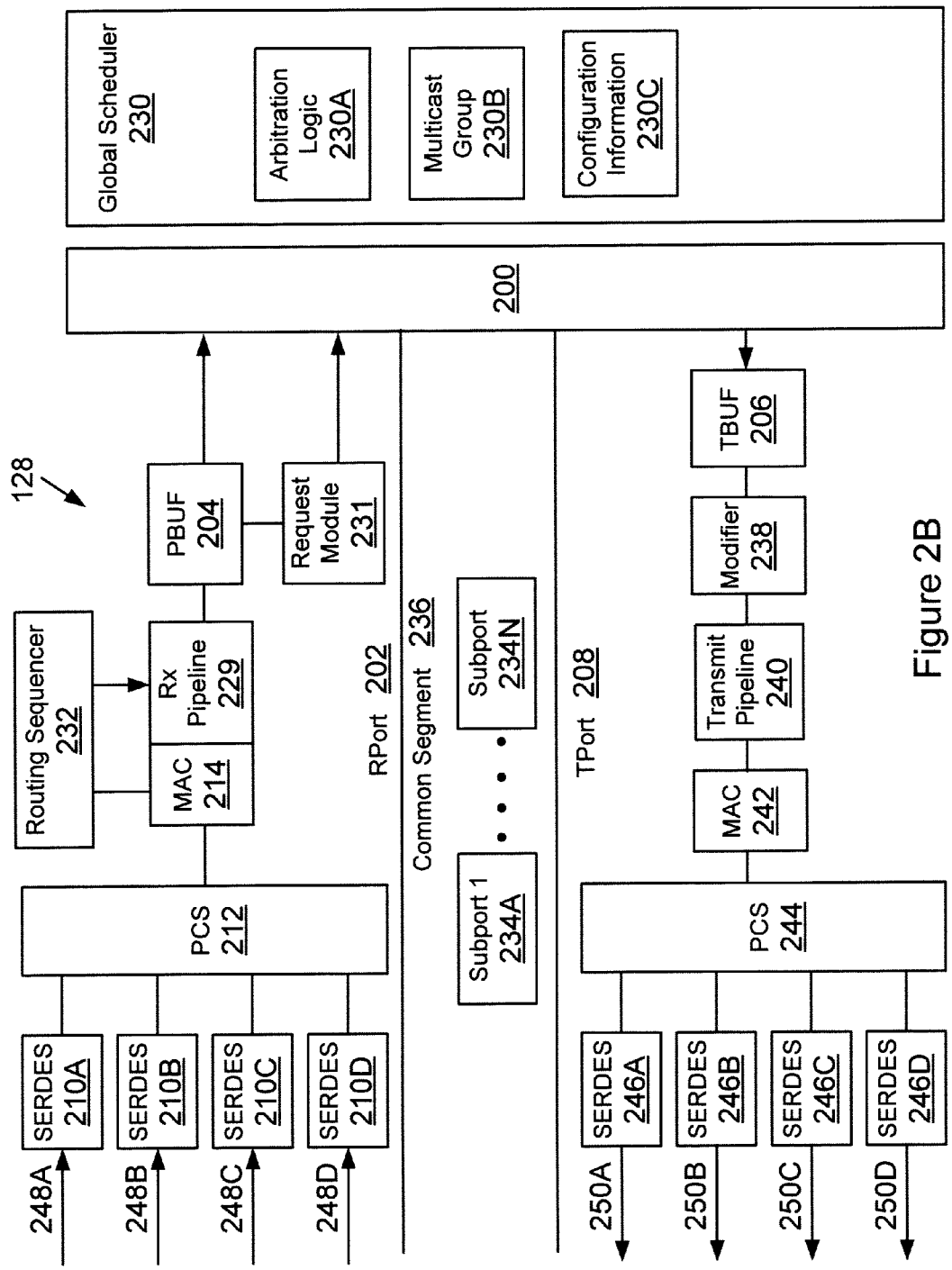
FIG. 2B shows a block diagram of a base-port, according to one embodiment.

FIG. 2B shows an example of base port 128 having RPORT (receive segment) 202, TPORT (transmit segment) 208, and a common segment 236, according to one embodiment. RPORT 202 is used for receiving and processing frames, while TPORT 208 is used for transmitting frames. Common segment 236 is used to store configuration and status information that may be commonly used among different components of base port 128.

In one embodiment, base port 128 may be configured to include a plurality of sub-ports. The configuration, status, and statistics information/logic 234A-234N for each sub-port may be stored in common segment 236. The configuration logic 234A-234N may include look up tables or other data structures for storing configuration information.

RPORT 202 may include or be coupled to a plurality of network links, for example, four independent physical network links (or lanes) 248A-248D, each configured to operate as a portion of an independent sub-port within base port 128. Each network link is coupled to a SERDES 210A-210D, all of which share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. In one embodiment, PCS 212 and MAC 214 may be a part of the receive pipeline 229.

Incoming frames are received via one of the network links 248A-248D. A received frame is processed by the appropriate SERDES and then sent to the PCS 212. After PCS 212 processes the frame, the frame is provided to MAC 212 that is time-shared among a plurality of sub-ports. Thus, for a certain time segment (for example, a clock cycle), MAC 214 may be used by one of the sub-ports. After the MAC 212 processes the frame it is sent to receive pipeline 229 that is also time-shared.

Information regarding the frame or a copy of the frame is also provided to a routing sequencer (or module) 232 that determines a destination for the received frame. In one embodiment, a frame whose destination is processor 224 is given the highest priority, followed by a frame that is routed by a ternary content addressable memory (TCAM) or steering registers located within the routing sequencer 232. More than one routing sequencer 232 may be used for each base port 128. Frames that are ready to be sent out are staged at PBUF 204. PBUF 204 may have a plurality of queues (or slots) that may be referred to as receive queues. The receive queues temporarily store frames, until a request to move each frame is granted.

To move frames from the receive queues, a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 includes arbitration logic 230A that performs dual stage arbitration for requests from various base ports. Scheduler 230 also maintains a data structure at a memory labeled as multicast group 230B. The data structure stores information for identifying multicast groups that may receive multicast frames, e.g., frames that are destined to multiple destinations. Scheduler 230 stores configuration information 230C for various ports and some of that information may be used to select requests.

Frames for transmission via TPORT 208 move via TBUF 206 and a modifier 238. In one embodiment, modifier 238 may be used to insert or remove information from an outgoing frame. The modification may be based on the frame type. The time-shared transmit pipeline 240 and MAC 242 are used to process outgoing frames. MAC 242 may be a part of transmit pipeline 240. PCS 244, SERDES 246A-246D are used similarly to PCS 212 and SERDES 210A-210D. Network links 250A-250D are similar to links 248A-248D, except links 250A-250D are used to transmit frames. Furthermore, although separate MAC and PCS are shown for the transmit segment, the same PCS 212 and MAC 214 of the receive segment may be used in the transmit segment.

FIG. 3A shows an example of an FCoE packet format 300 for processing network and storage traffic, according to the present embodiments. The FCoE packet 300 includes an Ethernet header 302. In one embodiment, the Ethernet header 302, which includes the Ethernet type, may be fourteen bytes in length, for example. The Ethernet header may also include optional Tag fields (not shown). The FCoE packet 300 also includes an FCoE header 304 that includes a number of reserved fields. A start of frame (SOF) 306 indicates the beginning of the embedded Fibre Channel frame and may be one byte, for example.

The FCoE packet 300 may also include a Fibre Channel header (FC Header) 308 that may be 24 bytes long with a payload 310. The Fibre Channel cyclic redundancy code (CRC) 312 may be 4 bytes and the Fibre Channel end of frame (EOF) 314 may be 1 byte in size. The EOF 514 indicates the end of the embedded Fibre Channel frame. The Ethernet FCS 316 is inserted after the Fibre Channel EOF 514.

FIG. 3B shows a standard 24-bit Fibre Channel address identifier 324. The address identifier 324 includes a Domain_ID 318, an Area_ID 320, and a Port_ID 322. The Domain_ID 318 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 320 is an Area identifier based on the middle 8 bits of the 24-bit Fibre Channel address. The Area_ID 320 applies either to (a) one or more N_Ports within and attached to a Fibre Channel switch, or (b) to an Arbitrated Loop of NL_Ports attached to a single FL_Port.

The Port_ID 322 is the lower 8-bits of a Fibre Channel address. The Port_ID 322 applies to either (a) a single N_Port or virtualized N_Port within a Domain/Area, (b) the valid AL_PA of a single NL_Port or FL_Port on an Arbitrated Loop.

FIG. 3C shows an example of the FC header 308 of FIG. 3A. The following frame header fields that are used in the present methods are:

D_ID 308A—A 24-bit Fibre Channel frame header field that contains the destination address for a frame; and S_ID 308B—A 24-bit Fibre Channel frame header field that contains the source address for a frame.

Zoning is a technique used by network devices to control access to storage space and devices. Zoning is used to prevent unauthorized access to devices via switch ports, adapters and other devices. Typically, a zone is created by a network device. Devices within the zone are granted permission to communicate with each other. When an access request from an unauthorized device is obtained, zoning data is used to prevent access.

Hard Zoning is a zoning type that is enforced on individual packets sent from one end-user device to another end-user device by preventing delivery of packets across zone boundaries. The present embodiments extend hard zoning to Ethernet so that an initiator device (for example, host system 102) can access some network devices (for example, 122, 124 and/or 126), but is denied access to others. A method is also described for a switch element to intercept an initiator's discovery process, so that the initiator does not try to access devices that it is not allowed to, thereby avoiding additional error reporting. This feature allows better integration of Ethernet ports using FCoE protocol to interface with Fibre Channel fabrics.

In FCoE S_ID hard zoning according to the present embodiments, a switch element port checks the S_ID field and the D_ID field of received FCoE packets against a list of S_IDs that are allowed to send packets to the destination port identified by the D_ID field. The check may be performed at an ingress switch element port where the packet is initially received, or at the egress switch element port from where the packet is transmitted. FCoE packets or Fibre Channel frames are only transmitted from the switch element port if the source port identified by the S_ID is allowed to send packets to the destination port identified by the D_ID. On Ethernet configured switch element ports. Ethernet packets that are not FCoE, and/or those with a different EtherType field value, are optionally all allowed to be transmitted without checking, or are rejected.

As discussed further below with respect to FIG. 5, when a packet is received at a switch element port, it is first determined whether a translation is needed. The arrival could be from devices 120 outside the switch element or another switch element port via the crossbar interconnect 200. The port may be configured as FC or Ethernet, so whether a translation is needed depends upon the protocol of both the packet and the port configuration. A translation is needed if the packet is an FCoE packet that is received at an FC port, or if the packet is an FC packet that is received at an Ethernet port. As an example, for received FCoE packets, various Ethernet tag fields may be examined before the packet's Ether Type field can be determined. These optional Tag fields include VLAN tags. The IEEE standards may also refer to these optional Tags as S-Tags, C-Tags or CN-Tags. Additional Tag types may be added by the standards bodies from time to time.

After any necessary translation has been performed, fields from the packet header are compared to values in lookup tables (or data structures) to determine if the packet should be transmitted at its destination. With reference to FIG. 4, in one embodiment base-port 128 may include a plurality of lookup tables, for example, a source Address Look Up Table (ALUT) 400, and a Destination Address Look Up Table (LLUT) 402. The ALUT 400 and LLUT 402 may be located in a common area (or common port) 404 (or 236, FIG. 2B) of the port 128.

The following values may be stored in the ALUT table 400:
Domain—8 bit field that is compared with bits 16-23 of the frame S_ID if enabled
Area—8 bit field that is compared with bits 8-15 of the frame S_ID if enabled
Port—8 bit field that is compared with bits 0-7 of the frame S_ID if enabled
Compare mask—2 bit field controls how a compare operation is performed
0—ALUT entry is not valid, not compared
1—Compare Domain, Area, and port with frame S_ID
2—Compare Domain and Area with frame S_ID
3—Compare Domain with frame S_ID The final output from the ALUT 400 is a bit map of zones based on a packet's S_ID.

Each entry in the LLUT table 402 is a bit map of zones for each of the D_IDs that is represented by the switch element port. There may be one or more destination devices zoned by a single switch element port.

Each time an FCoE or FC packet arrives and it is to be transmitted, its S_ID is compared to all the ALUT table 400 entries. In two non-limiting examples, the comparison may be done with associative memory hardware, or by some other lookup method such as hashing. If no ALUT table 400 entries match the packet, the packet is rejected. Similarly, if multiple ALUT table 400 entries match the packet, the packet may be optionally rejected. This multiple match feature can be used in conjunction with wildcarding, not enabling match compares on all 3 of the S_ID fields, to more efficiently use the ALUT table entries. For example, if all of the Port_ID values of a given S_ID are allowed except one Port_ID value, this check can be performed with two ALUT entries. A non-wildcard approach may use 255 ALUT table entries to perform the check. If there is a single ALUT 400 match, the ALUT 400 zone bit map is compared with the LLUT 402 zone bit map, and, if there are any matching bits between the two maps, the packet is allowed to be transmitted.

If a frame is rejected, it may either be discarded or sent to the switch element processor 224. A separate policy control code could be used to decide the disposition of frames rejected by hard zoning. The switch element may want to bring frames that fail hard zoning to the switch element processor so that the switch element can send a reject response back to the initiator.

Figure 5:
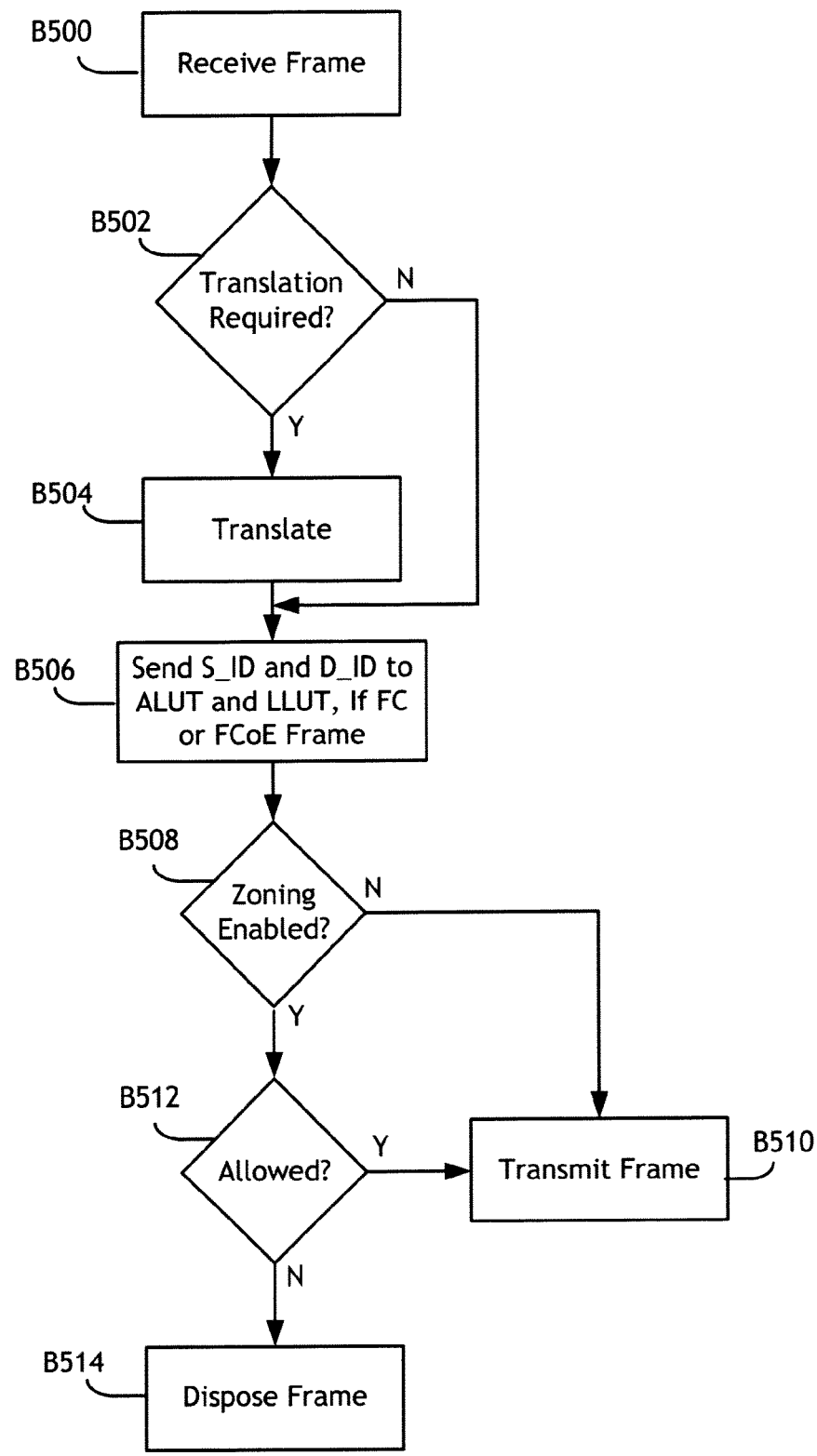
FIG. 5 is a flowchart illustrating one embodiment of the present methods for hard zoning in networks.

FIG. 5 illustrates one embodiment of the present methods for hard zoning in networks. The process begins at block B500 when a frame is received at the RPORT or TPORT, depending on where in the switch element zoning is performed. At block B502 it is determined whether the frame needs to be translated. There are conditions when a translation is performed, but translations may be optionally performed under other conditions. Translation is performed if the packet is an FCoE packet that is received at an FC port, or if the packet is an FC packet that is received at an Ethernet port. Translation may optionally be performed on any field of a packet, but for the described embodiment translation as outlined refers to the conversion of Fibre Channel frames to FCoE frames or vice versa.

If a translation is needed, the process advances to block B504 where the packet is translated and the process then advances to block B506. The translation on the transmit side is performed by modifier 238. However, if translation is not needed, the process skips block B504 and advances to block B506.

At block B506 the S_ID and D_ID of the packet are sent to the ALUT/LLUT tables 400/402. The S_ID or D_ID that is sent to the ALUT/LLUT for checking could optionally be a translated or an un-translated value. The process then advances to block B508, where it is determined whether zoning is in effect. If not, the process advances to block B510 and the frame is transmitted to the destination identified in its D_ID. However, if zoning is in effect, the process advances to block B512 where the S_ID of the packet is compared to all the ALUT table 400 entries corresponding to the D_ID of the packet. If no ALUT table 400 entries match the packet, the packet is rejected at block B514. Similarly, if multiple ALUT table 400 entries match, the packet is rejected at block B514. If there is an ALUT 400 match, the ALUT 400 zone bit map is compared with the LLUT 402 zone bit map, and, if there are any matching bits between the two maps, the packet is transmitted at block B510. In one embodiment, special zone mask values could be used for special processing to stop a denial of service attack on the network using FC or FCoE frames.

What happens in blocks B502-B508 above depends upon the protocol of both the received packet and the port. For an Ethernet protocol configured port, if an FC frame is received, it will be translated to an FCoE frame at block B504 and will, therefore, be subjected to a zoning check at block B506 before it is transmitted. Again for an Ethernet protocol configured port, if an FCoE frame is received, it may be optionally translated at block B504, but will be subjected to a zoning check at block B506 before it is transmitted. Again for an Ethernet protocol configured port, if a non-FCoE frame is received, it may be optionally translated at block B504, but will not be subjected to a zoning check at block B506 before it is transmitted. It will simply advance from block B502 directly to block B510. In yet another embodiment, non-FCoE frames to be transmitted will be optionally rejected by Ethernet configured ports.

For an FC protocol configured port, if an FC frame is received, it may be optionally translated at block B504, but will be subjected to a zoning check at block B506 before it is transmitted. Again for an FC protocol configured port, if an FCoE frame is received, it will be translated to an FC frame at block B504, and will be subjected to a zoning check at block B506 before it is transmitted. Again for an FC protocol configured port, if a non-FCoE Ethernet packet is received, it will signal an error condition.

To fully support zoning, the S_ID field of ingress FCoE and FC frames may optionally be validated to prevent spoofing of the S_ID field upon entry into the switch element. This validation is performed when the zoning circuits are located outside of the receive port and the receive port identity is not passed with the packet to the zoning mechanism.

The present embodiments advantageously leverage S_ID hard zoning in the FCoE environment to prevent inadvertent or malicious access to network devices. The present embodiments are also compatible with N_Port ID Virtualization (NPIV) ports. NPIV is a Fibre Channel facility allowing multiple N_Port IDs to share a single physical N_Port. This allows multiple Fibre Channel initiators to occupy a single physical port, easing hardware requirements in Storage Area Network (SAN) design, especially where virtual SANs are called for. NPIV is defined by the Technical Committee T11 in the Fibre Channel-Link Services (FC-LS) specification.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in adapters or other network devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine-implemented method for controlling access to network devices in a network, the method comprising:
    receiving a frame at a port of one of the network devices; wherein the port includes a plurality of sub-ports configured to operate as independent ports for sending and receiving frames using one of a plurality of network links at a plurality of rates and complying with a plurality of protocols;
    sending a source identifier of the frame and a destination identifier of the frame to a source address look up table (ALUT) and a destination address look up table (LLUT);
    comparing the source identifier of the frame with entries in the ALUT;
    outputting a bit map of zones based on the source identifier of the frame when one ALUT table entry matches the source identifier of the frame;
    comparing the output bit map of zones with a zone bit map of the LLUT; and
    transmitting the frame when there are any matching bits between the two maps.

2. The method of claim 1, further comprising: rejecting the frame when no ALUT table entries match the source identifier of the frame.

3. The method of claim 2, further comprising: presenting the rejected frame to a switch element processor, and the processor sending a reject response to a source of the rejected frame.

4. The method of claim 1, further comprising: rejecting the frame when multiple ALUT table entries match the source identifier of the frame.

5. The method of claim 4, further comprising: presenting the rejected frame to a switch element processor, and the processor sending a reject response to a source of the rejected frame.

6. The method of claim 1, further comprising: determining whether the frame needs to be translated from a first protocol to a second protocol.

7. The method of claim 6, further comprising if translation is needed, translating the frame from the first protocol to the second protocol.

8. The method of claim 7, wherein the first protocol is Fibre Channel and the second protocol is Fibre Channel over Ethernet (FCoE), or vice versa.

9. The method of claim 1, wherein comparing the source identifier of the frame with entries in the ALUT comprises hashing or using associative memory hardware.

10. The method of claim 1, wherein the ALUT and the LLUT are located in a common area of the port.

11. A switch element configured to control access to devices in a network, the switch element comprising:
    a port configured to receive a frame; wherein the port includes a plurality of sub-ports configured to operate as independent ports for sending and receiving frames using one of a plurality of network links at a plurality of rates and complying with a plurality of protocols;
    a source address look up table (ALUT) and a destination address look up table (LLUT), wherein when the frame is received the switch element is configured to compare a source identifier of the frame and a destination identifier of the frame to the ALUT and the LLUT;
    wherein when one ALUT table entry matches the source identifier of the frame, the switch element outputs a bit map of zones based on the source identifier of the frame, compares the output bit map of zones with a zone bit map of the LLUT, and when there are any matching bits between the two maps, transmits the frame.

12. The switch element of claim 11, wherein when no ALUT table entries match the source identifier of the frame, the switch element rejects the frame.

13. The switch element of claim 12, wherein the switch element presents the rejected frame to a switch element processor, and the processor sends a reject response to a source of the rejected frame.

14. The switch element of claim 11, wherein when multiple ALUT table entries match the source identifier of the frame, the switch element rejects the frame.

15. The switch element of claim 14, wherein the switch element presents the rejected frame to a switch element processor, and the processor sends a reject response to a source of the rejected frame.

16. The switch element of claim 11, wherein the switch element determines whether the frame needs to be translated from a first protocol to a second protocol.

17. The switch element of claim 16, wherein when translation is needed, the switch element translates the frame from the first protocol to the second protocol.

18. The switch element of claim 17, wherein the first protocol is Fibre Channel and the second protocol is Fibre Channel over Ethernet (FCoE), or vice versa.

19. The switch element of claim 11, wherein comparing the source identifier of the frame with entries in the ALUT comprises hashing or using associative memory hardware.

20. The switch element of claim 11, wherein the ALUT and the LLUT are located in a common area of the port.

* * * * *